United States Patent Office

2,907,747
Patented Oct. 6, 1959

2,907,747

POLYURETHANES OF POLYISOCYANATES AND RESINOUS POLYMERIC ACIDS

Sylvan O. Greenlee, Racine, Wis., assignor to S. C. Johnson & Son, Inc., Racine, Wis.

No Drawing. Application January 28, 1957
Serial No. 636,478

7 Claims. (Cl. 260—47)

This invention relates to novel resinous compositions of matter of the polyurethane type and is directed more particularly to synthetic resinous compositions derived from the reaction of resinous polybasic acids with isocyanates.

One of the objects of this invention is to provide a new class of synthetic resinous compositions which are capable of further reaction to give infusible, insoluble materials suitable for use as protective coatings, adhesives, and molding resins.

A further object is the synthesis along the general lines of known reactions of a film-forming product characterized, by virtue of the novel reactants from which it is derived, with improved properties especially as regards resistance to attack by common chemicals, resistance to wear or damage, and resistance to penetration and solvent action by water.

By suitable adjustment of the conditions of the reaction and the ingredients, the product of the invention may be caused to assume a cellular or foam state, and, accordingly, an additional aim of the invention is the provision of light-weight three dimensional solids possessing good structural strength and, therefore, useful in load-bearing applications.

These and other objects are accomplished by the present invention which contemplates the reaction of a substantial amount of an isocyanate or isothiocyanate, at least half of which must contain two or more isocyanate or isothiocyanate groups per molecule, with a polymeric polybasic acid formed by condensing a polyfunctional coupling agent with an aliphatic acid, having a total of at least five carbon atoms with a single carbon atom being substituted with two hydroxyaryl groups.

It has been found that the reaction of resinous polybasic acids with polyisocyanates is an unusually advantageous mechanism for obtaining polymeric resinous compositions characterized by excellent protective coating and adhesive properties when used as a film, and high structural strength when cast into foam resin bodies. The resinous polybasic acids are especially adapted for the reaction by virtue of the presence in each molecule thereof of a large number of carboxyl groups. As will be explained more fully, carboxyl radicals condense with an isocyanate group and, thus, contribute to the formation of an infusible, insoluble product; in addition, the carboxyl radical during the condensation liberates carbon dioxide which can be utilized in producing foam resin structures. The resinous polybasic acids are high melting, polymeric compositions having a large number of unique symmetrical residues and tend to confer upon the reaction product such properties as outstanding chemical resistance and superior hardness and toughness. Chemical resistance is, for example, of great value in the formulation of protective coatings which are likely to be subjected in the course of ordinary usage to contact with various chemicals. The presence in the ultimate resin of a large number of residues of symmetrical structure results in a more rigid product, a feature of much advantage in polyurethane foams.

The resinous polybasic acids contemplated for use herein are compounds containing a large number of molecules of a bis-hydroxyaryl aliphatic acid which are coupled one to another through ether oxygen by alkylene or substituted alkylene radicals. They may be prepared, for example, by heating a bis-hydroxyaryl aliphatic acid, such as 4,4-bis(4-hydroxyphenyl)-pentanoic acid, in the presence of alkali, with a difunctional coupling agent, such as a dihalohydrin, a dihalide, or an epihalohydrin. Illustrative possible polycarboxylic acids are the following:

4,4-bis(4-hydroxyphenyl)-pentanoic acid + dichlorobutene

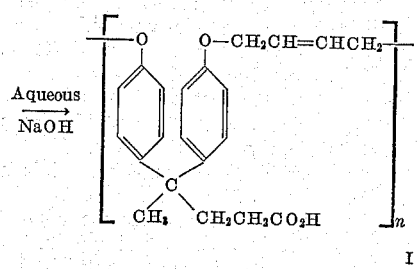

I 4,4-bis(4-hydroxyphenyl)-pentanoic acid + dichlorodiethyl ether

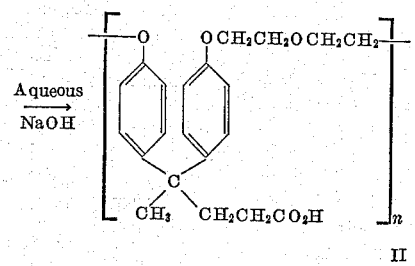

II 4,4-bis(4-hydroxyphenyl)-pentanoic acid + epichlorohydrin

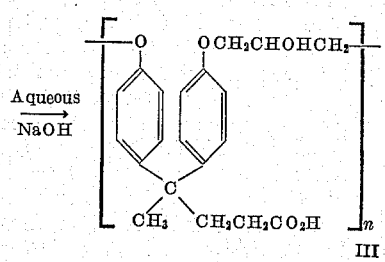

III 4,4-bis(4-hydroxyphenyl)-pentanoic acid+bis(4-hydroxyphenyl)-isopropylidene + 1,4-dichlorobutane

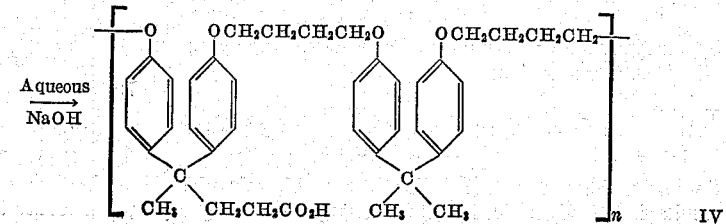

IV wherein n indicates the degree of polymerization and depends for its value on the quantities of reactants employed, the maximum value for n having been found to be less than about 15. The compound shown at IV illustrates one method of obtaining a lower acid number should it be desirable for a particular use.

The terminal groups in all of these polycarboxylic acids will vary depending on the ratio of bis-hydroxyaryl aliphatic acid to aliphatic coupling agent. If excess of the former is used, for example, in reaction with dichlorobutene, the end groups will be phenolic hydroxyl groups. If, on the other hand, dichlorobutene is used in excess, the end groups will be chlorobutene groups.

The bis-hydroxyaryl aliphatic acids used in the preparation of the resinous polybasic acids may be, and preferably are, prepared by condensing a phenolic compound with a keto-acid under such conditions that two hydroxyaryl radicals are attached to the same carbon atom of the acid. In order for the yields of this reaction to achieve useful levels, it is necessary, first, that the keto-carbon atom occur at the position adjacent a terminal methyl group, and second, that the keto-acid have at least five carbons in the aliphatic chain. The keto-acid of this type which has only four carbon atoms, acetoacetic acid, is highly unstable under the conditions necessary for the reaction and does not produce the desired product. The five-carbon acid, levulinic acid, gives excellent yields. Higher acids are apparently useful, but these exist principally as laboratory curiosities and are not available in commercial quantities. There is disclosed in prior co-pending applications, Serial Nos. 464,607 and 489,300, filed October 25, 1954 and February 18, 1955, respectively, a number of illustrative acids that have been found to be particularly suitable for use, as well as methods of preparing the same. These acids consist of the condensation products of levulinic acid and phenol, substituted phenols, or mixtures of phenol and substituted phenols and shall, for the sake of brevity, be referred to herein as Diphenolic Acid.

The term "substituted phenols" is used herein to embrace phenols and phenolic compounds wherein one or more hydrogen atoms of the phenyl nucleus is replaced by an atom or group that does not enter into, or otherwise interfere with, the condensation of the compound with the keto-acid. Thus, for example, the nucleus may be alkylated with a methyl or other alkyl group, preferably having not more than five carbon atoms, as disclosed in the aforementioned application, Serial No. 489,300, or halogenated with bromine, fluorine, chlorine or combinations thereof, provided that the total number of substituents, including hydroxyl groups, does not exceed three. The Diphenolic Acid derived from substituted phenols, such as the alkylated phenols, is sometimes more desirable than the products obtained for unsubstituted phenols since the alkyl groups tend to provide better organic solvent solubility, flexibility, and water resistance, as well as influencing the nature and extent of subsequent reactions for which the acids are adapted. However, the unsubstituted product is usually more readily purified.

The coupling agents advantageously used in building up the desired molecular structure of the resinous polycarboxylic acids must be bifunctional in their reactions with phenolic hydroxyl groups in the presence of alkali. Exemplary coupling agents having this characteristic are the aliphatic dihalides. The reaction of phenolic hydroxyl group with an alkyl halide forms an ether linkage by the well known Williamson synthesis, employing an alkali metal phenoxide:

Similarly, the use of a dihalide and a dihydric phenol results in a polymeric structure having alternating aryl and alkyl groups joined to one another by ether oxygen linkages.

From the discussion of the reaction, one will be able to deduce that virtually any dihalide will be suitable as a coupling agent, provided that it contain no substituents which react with an alkali metal phenoxide or otherwise interfere with the etherification reaction. Illustrative dihalides are 1,2-dichloroethane, 1,3-dichloropropane, 1,4-dichlorobutane, 1,4-dichlorobutene, glycerol dichlorohydrin. Also appropriate are the oxy-dihalides wherein one of the carbon atoms is replaced by oxygen or is hydroxylated, such as the alkylene halohydrins or ethers, an example of which is bis(2-chloroethyl)ether. Halogens other than chlorine may, of course, be present. The dihalide may be saturated or unsaturated and contain up to about 10 carbon atoms.

An additional class of coupling agents operable herein is the simple difunctional epoxy compounds, it being known that an epoxide group is converted by a phenolic hydroxyl group to form an ether linkage. Preferred epoxy compounds are the epihalohydrins, such as epichlorohydrin or epibromohydrin. Also suitable are the oxy-epihalohydrins wherein one of the carbon atoms is replaced by ether oxygen, an illustration being 2,3-epoxypropyl-2-hydroxy-3-chloropropyl ether, as well as the simple aliphatic polyepoxides.

Reaction of the bis-hydroxyaryl aliphatic acids with dihalides or mixed epoxyhalo-compounds is carried out in the presence of sufficient amounts of a strong alkaline compound, such as sodium hydroxide, to neutralize the carboxyl group of the acid and to react with the halogen group of the halide or halohydrin. To illustrate: the reaction of one mol of the acid with one mol of epichlorohydrin would require 2 mols of sodium hydroxide, one to neutralize the carboxyl group, and one to take up the chlorine ions liberated from epichlorohydrin in the reaction. Similarly, the reaction of two mols of the acid with one mol of a dichloride would require four mols of sodium hydroxide. Usually, in practice, alkali is used somewhat in excess of the theoretical amounts to insure the presence of adequate amounts. Alkaline reactions of this type are conveniently carried out in aqueous solution; however, highly polar organic solvents may be used. Preferably, the temperature is maintained within the range of 75–150° C. during the reaction. Thus, the condensation of an epihalo-compound, such as epichlorohydrin with a bis-hydroxyaryl aliphatic acid to give the polybasic acids might, for example, be carried out at temperatures of from 75–100° C. for periods of 30 minutes to an hour. The reaction of active chlorides, such as 1,4-dichlorobutene, with the sodium phenoxide groups also proceeds well at relatively low temperatures, of around 100° C., for short periods of time, of about 1 hour. Less reactive halides, such as 1,4-dichlorobutane, on the other hand, require more vigorous reaction conditions of several hours heating at about 100° C., or of higher temperatures for shorter periods of time.

The simple aliphatic polyepoxides demand the exercise of much more care in neutralizing the carboxyl group of the acid, either by way of esterification or formation of a salt, to prevent it from taking part in the reaction than do the halogen-containing coupling agents. With these compounds, the temperature should be maintained within the range of about 90–200° C. Preferably, the reaction is effected in the absence of a solvent although an organic solvent can be used provided it is free of functional groups that might interfere with the epoxide-phenolic hydroxyl addition. If the simple polyepoxides are to be reacted with an alkyl ester of the acid, the use of a trace amount of a catalyst such as boron trifluoride adducts, is recommended in order to accelerate the addition.

The other component of the reaction of the present invention is an isocyanate or isothiocyanate compound. In order that a resinous product be obtained, the isocyanate or isothiocyanate compound must contain two or more isocyanate or isothiocyanate groups, a plurality of functions being essential if a chain or cross-linked structure is to be developed by condensation with the functional groups of the Diphenolic Acid. Accordingly, the principal reaction contemplated herein may be described as between a resinous polybasic acid and a polyisocyanate having the general formula $R(NCX)_z$, where X is a chalcogen having an atomic weight less than 33, i.e., oxygen or sulfur; z is an integer of more than one; and R is a polyvalent organic radical with the number of valences being equal to z. There are numerous compounds coming within this formula that are suitable for the reaction and no attempt will be made to give an exhaustive list. The following are considered illustrative and will suggest to the expert a variety of others: alkylene diisocyanates, such as ethylene diisocyanate, trimethylene diisocyanate, tetramethylene diisocyanate, hexamethylene diisocyanate, decamethylene diisocyanate, and their corresponding sulfur analogues; cyclo-alkylene diisocyanate, such as cyclopentylene diisocyanate, cyclohexylene diisocyanate, and their corresponding sulfur analogues; aromatic diisocyanates, such as m-phenylene diisocyanate, naphthalene diisocyanate, diphenyl-4,4'-diisocyanate, and their corresponding sulfur analogues; aliphatic-aromatic diisocyanates, such as xylene-1,4-diisocyanate, diphenylene methane diisocyanate and their corresponding sulfur analogues; hetero- diiso- and diisothiocyanates, such as $SCNCH_2OCH_2NCS$ and $SCNCH_2SCH_2NCS$; and isocyanates and isothiocyanates having more than two isocyanate or isothiocyanate groups, such as benzene 1,2,4-triisocyanate, 1,2,2-triisocyanateobutane, and toluene triisocyanate. From among these and other polyisocyanates and polyisothiocyanates, the following are preferred largely by reason of their ready commercial availability: toluene 2,4 diisocyanate, toluene 2,6 diisocyanate, methylene bis(4-phenyl isocyanate), 3,3' bitolylene 4,4' diisocyanate, and hexamethylene diisocyanate. In order to simplify the remainder of the discussion, the repetitious recital of both the oxygen and sulfur forms will be dispensed with; only the oxygen compound will be given but will be understood as embracing the corresponding sulfur analogue.

While, as has already been mentioned, the principal reaction requires a polyisocyanate compound, it is desirable for certain applications to modify the product by using, in addition, a minor portion of a monoisocyanate. Some of the reaction products of resinous polybasic acids with polyisocyanates alone are brittle infusible products; on the other hand, flexible infusible products may frequently be obtained by the addition to the reaction mixture of a proper amount and type of monoisocyanate. Examples of suitable monoisocyanates are octadecylisocyanate and hexyl isocyanate, to mention just a few of the simpler compounds. Flexibility is particularly apparent where long-chain compounds, i.e. having more than 11 carbons, are employed. Unsaturated mono-isocyanates are also suitable and provide an additional aid to conversion or curing. The amount of the mono-compound that is added to the acid and polyisocyanate as a modifier will vary depending upon the characteristics desired in the product. As a general rule, there should be present a greater amount of the poly-compound than the mono-compound, which is to say, that the monoisocyanate should be less than 50% of the total of all isocyanates in the reaction mixture. If a more rigid, brittle material is sought, the quantity of the mono-form should be decreased while, if more flexibility is the desideratum, it should be increased toward the upper limit just mentioned. The functional group of the mono-form may react with the carboxyl or alcoholic hydroxyl groups, where the latter are present, of the acid to reduce cross-linking between adjacent molecules and thereby enhance the softness and pliability of the polymer in proportion to the amount present, or it may react with the terminal hydroxyl groups of the acid polymer and preclude further growth at the ends of the chain.

The general chemistry of the present reaction appears to be reasonably basically simple. It is well known that isocyanates react with both phenolic hydroxyl groups and carboxylic acid groups. The reaction of a diisocyanate, $R'(NCO)_2$, with a phenolic hydroxyl group, such as that in phenol, proceeds in the following manner:

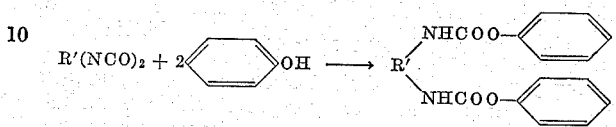

In similar fashion, the reaction between a diisocyanate and a carboxylic acid, RCOOH, is as follows:

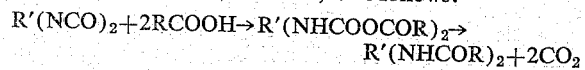

It will be seen that in either of these reactions, if the phenolic compound contains two hydroxyl groups or if the carboxylic acid contains two acid groups, the resulting product would be polymeric. Likewise, it will be observed that if a compound is used containing both carboxyl groups and phenolic hydroxyl groups, there is the possibility of simultaneous reaction of both with the isocyanate to give polymeric compounds. It will also be observed that the reaction with a carboxyl-containing compound gives, as a by-product of the reaction, carbon dioxide which may be used to form cellular structures in those reaction products which are intended to be three-dimensional structures.

Applying these general considerations to the reactants proposed herein, a resinous polybasic acid and a polyisocyanate, $R(NCO)_z$, it will be appreciated that the directions in which the reaction might go are numerous. The resinous acid, as can be seen from Formulas I–IV, contains a relatively large number of carboxyl groups together with terminal hydroxyl groups. In addition, where the coupling agent contains one or more alcoholic hydroxyl groups, as in Formula III, such groups will exist in free condition in the polymer. Thus, the isocyanate may bridge carboxyl groups of two molecules of the acid polymer, a carboxyl group of one and a hydroxyl group, either phenolic or alcoholic, of another, or hydroxyl groups of both, as well as combinations of two or more of these. The exent to which these reactions will occur is dependent upon the actual amounts of isocyanate available for reaction and the distribution of the isocyanate molecules among the acid molecules. The choice of relative proportions of acid and polyisocyanate is dictated principally by the nature of the ultimate product to be obtained. Experience has indicated that a product having useful characteristics attributable to both reactants is obtained generally at a ratio of equivalent weights of polybasic acid to polyisocyanate within the range of 1:5 to 5:1. From a consideration of the reaction, it will be understood that the optimum situation prevails where all of the functional groups of the acid are reacted with functional groups of the polyisocyanate. For this reason, a preferred range is 2:1 to 1:2 of acid to isocyanate on equivalent basis with a 1:1 ratio being most desired. As a general rule, it can be postulated that as the proportion of acid is increased, the polymer becomes more rigid and hard while, conversely, as the proportion of isocyanate is increased, the polymer becomes more flexible, this being particularly true where the isocyanate that is used has its functional groups separated by fairly long chains so that the acid nuclei are spaced relatively large distances apart within the molecule of the polymer, which thus assumes a more or less linear configuration. On the other hand, where the isocyanate is of a tightly knit, cyclic structure, the tendency is toward enhanced rigidity and brittleness.

If a monoisocyanate is employed along with the polyisocyanate, the number of reactive foci of the resinous polybasic acid available to the functional groups of the polyisocyanate is lessened. In arriving at the amounts of reactants to be utilized, the mono-compound must therefore be considered, and in such case the equivalent weight of the isocyanate is the total of the equivalent weights of the mono- and poly-compounds.

In general, the procedure by which protective coating films are prepared in accordance with the present invention involves merely the addition at ordinary temperatures of the polybasic acid to the isocyanate, the acid, if a solid being previously dissolved in a suitable organic solvent, forming a film of the desired thickness of the mixture, and converting the mixture by exposure either at normal temperatures or to heat. In some cases it may be desirable to dilute the mixture and/or dissolve the isocyanate to lower the viscosity of the mixture and, thus, vary the film thickness of a single coat. Any solvent that is inert to both the acid and isocyanate may be used, an example being methyl ethyl ketone among many others. The mixture of reactants, either diluted or not, has been found to be relatively stable for moderate periods at normal temperatures. Such stability is a feature of some importance as it permits large quantities of the mixture to be made up at one time and then used as needed. For heat cure, temperatures of about 100–225° C. for times of about one hour to above five minutes have been found satisfactory. For a normal temperature cure, it is preferred that any of the well known conversion catalysts for reactions of this type, such as triethanolamine, be added in small amounts in order to reduce the amount of time needed for the film to harden. When early conversion is of no special advantage, the catalyst may be dispensed with. As the examples show, the characteristics of the cured films vary somewhat with the type and amount of the isocyanate employed, with some being better than others, as would ordinarily be expected. As a whole, however, the films possess characteristics that compare favorably with many other available materials so that the product of the invention is quite useful for a variety of purposes.

Where solid foam or cellular structure is desired, it may be obtained by mixing the resinous polybasic acid with a suitable conversion catalyst, of which triethanolamine is again an example, in an appropriate reaction vessel at temperatures at or above the melting point of the acid, adding the isocyanate while agitating, allowing the mixture to foam unimpeded, and converting by heating, as in a draft oven, at a temperature of about 100–225° C. for from about 5–30 minutes, or by normal temperatures for much longer periods. Although not essential, it is usually desirable to employ an emulsifier in order to obtain a more homogeneous mixture of the reactants. The reaction usually proceeds instantaneously at or above the melting point of the acid. The instant process may be carried out readily in any system which provides for stirring and has sufficient space for the foaming action to proceed unhindered. A modification of a unit currently used in commercial urethane foam production may be employed. Such a system comprises two supply tanks connected to a pressure-mixing nozzle by suitable feed lines. One tank contains the isocyanate and the other tank, which is necessarily heated, contains the resinous polybasic acid emulsified with the emulsifying agent and catalyst. The acid and isocyanate are fed from the tanks to the nozzle where they are mixed under pressure and flowed into pans where the foaming reaction is allowed to proceed unhindered. Again, the foams may be cured in a suitable draft oven at elevated temperatures, thus accelerating the operation. Although the foams may be cured by exposure to normal temperatures as in the case of the films, this considerably prolongs the curing time and a heat cure is preferred.

As has already been briefly mentioned, the resinous polybasic acids lend themselves especially well to the formation of urethane foams by reason of the numerous carboxyl groups which they contain. Such groups in the course of the reaction decompose to form gaseous carbon dioxide which bubbles through the mixture to produce a cellular structure. Thus, a foaming medium is inherently present, eliminating the need, in almost all instances, of an external foaming agent. In rare cases, it sometimes proves advantageous to add small amounts of water, say up to about 5% by weight of the mixture, to assist in the foaming action. The use of water merely as an assistant does not add unduly to the curing time of one hour or less which is in distinct contrast to typical present commercial polyurethane foam processes, wherein water is used as the sole foaming agent, which require a post-cure of some 24 hours' duration. The density of the foams made as described herein varies not only with the particular isocyanate selected for reaction but with the temperature of the conversion as well. It has been found that as the temperature of this stage is increased, the density of the foam also increases, due presumably to the increased loss of $CO_2$ from the mixture at the higher temperatures.

The toughness and rigidity contributed by the resinous polybasic acids are especially significant in the case of foam structures which have, in the past for the most part, been of rather soft, spongy texture. These characteristics, together with the resistance to water and common chemicals that the present foams exhibit as well as a very low density when compounded to this end, constitute a rather exceptional combination in this field, so that the present invention should be particularly valuable in producing foam solids for such uses as insulation, crash linings for vehicles, aircraft, etc., and structural components alone or in conjunction with outer coverings of wood or metal.

For the sake of brevity as well as convenience, most of the remainder of this disclosure will be presented in the form of three tables, the first two giving examples of the reaction components, along with some pertinent information concerning them and the third providing working examples of the invention in the coating field.

TABLE I.—REPRESENTATIVE RESINOUS POLYBASIC ACIDS

| No. | Acid | Abbreviation | Isocyanate equivalent (observed) |
|---|---|---|---|
| 1 | Condensation product of DPA[1] and 1,4-dichlorobutane: In a reaction vessel provided with a thermometer, a mechanical agitator, and reflux condenser was added 510 parts of sodium hydroxide in 800 parts of water. With continuous agitation 1,144 parts of 4,4-bis(4-hydroxyphenyl)pentanoic acid was added, and when completely dissolved 279 parts of 1,4-dichlorobutane was added. The continuously agitated mixture was refluxed for 7 hours after which the excess caustic was neutralized with HCl. The aqueous layer was removed by decantation, and the organic acid layer freed from salt by washing four times with hot water. The resinous product was finally freed from the last traces of water by heating with agitation to 125° C. This product had an acid value of 175. | PBR1 | 237 |
| 2 | Condensation product of DPA and 1,4-dichlorobutene-2: In a manner similar to 1 a solution of 858 parts of 4,4-bis(4-hydroxyphenyl) pentanoic acid dissolved in an aqueous alkali solution prepared from 410 parts of sodium hydroxide in 800 parts of water was refluxed for 6 hours with 218 parts of 1,4-dichlorobutene-2. After neutralization with HCl and washing free of salt, the product was freed from the last traces of water by heating with continuous agitation until the temperature had risen to 130° C. The product amounting to 680 parts had an acid value of 165. | PBR2 | 201 |
| 3 | Condensation product of DPA and bis(2-chloroethyl) ether: In an autoclave provided with a mechanical agitator was placed 1,500 parts of water, 300 parts of sodium hydroxide, 858 parts of 4,4-bis(4-hydroxyphenyl) pentanoic acid, and 286 parts of bis(2-chloroethyl)ether. The | PBR3 | 189.6 |

TABLE I.—REPRESENTATIVE RESINOUS POLYBASIC ACIDS—Continued

| No. | Acid | Abbreviation | Isocyanate equivalent (observed) |
|---|---|---|---|
| 3 | autoclave was closed and the reaction mixture heated with agitation at 150° C. for a period of 5 hours. The reaction mixture was cooled to below 100° C. so as to release pressure and the product was neutralized with HCl. The aqueous layer was removed by decantation and the resinous product washed 4 times with hot water to remove sodium chloride. The product was finally freed from the last traces of water by heating with continuous agitation to a temperature of 130° C. The product had a softening point of 72° C. and an acid value of 147. | PBR3 | 189.6 |
| 4 | Condensation product of DPA and bis(2-chloroethyl)ether: A mixture of 1,144 parts of 4,4-bis(4-hydroxyphenyl)pentanoic acid, 320 parts of sodium hydroxide, 1,500 parts of water, and 286 parts of bis(2-chloroethyl)ether was treated in the manner described in Example 3 and gave a product having a softening point of 69° C. and an acid value of 164. | PBR4 | 154.6 |

[1] DPA is the trademark for 4,4-bis(4-hydroxyphenyl)pentanoic acid.

It will be observed that an isocyanate equivalent is specified for each acid. The isocyanate equivalent is defined as the weight of the acid which will react with one equivalent of the isocyanate and will be of assistance in selecting actual amounts of the acid that should be used. The method used in determining the observed values as listed involves reacting a sample of the acid with an excess of toluene-2,4-diisocyanate and then determining the excess isocyanate by reaction with di-n-butylamine. Specifically, the technique used is as follows:

To 25 ml. of methyl isobutylketone is added 3 grams of toluene-2,4-diisocyanate previously standardized against di-n-butylamine and a weight of the acid such that the diisocyanate is present in approximately 100% excess. To this mixture is added triethylamine in an amount equal to 1% of the total weight of isocyanate and the acid. The mixture is refluxed for a period of one hour. After cooling to room temperature, the condenser walls are rinsed with about 25 ml. of redistilled toluene. To this mixture is added 25 ml. of 2 N di-n-butylamine. This mixture is warmed to the boiling point, allowed to stand for one hour at which point 75 ml. of methanol is added, and the excess di-n-butylamine back-titrated with 1 N alcoholic hydrochloric acid. By carrying out the preparation of the acids with great care, values at or approaching the theoretical can be achieved.

The acid number given for each acid has its usual meaning, which is the number of milligrams of potassium hydroxide necessary to neutralize the acid content of 1 gram of the sample, and provides an indication of the degree of acidity of the product.

TABLE II.—REPRESENTATIVE ISOCYANATES

| No. | Commercial source, trade name, and abbreviation | Structure | Amine equivalent Observed | Amine equivalent Theory |
|---|---|---|---|---|
| 1 | E. I. Du Pont de Nemours & Co., Inc.; Hylene T; Hy T. | 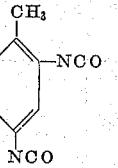 Toluene-2,4-diisocyanate | 90.62 | 87.07 |
| 2 | E. I. Du Pont de Nemours & Co., Inc.; Hylene M; Hy M. | 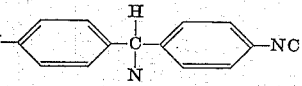 Methylene bis(4-phenyl isocyanate) | 139.98 | 125.12 |
| 3 | National Aniline Div.; Nacconate 200; N 200 | 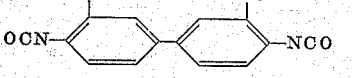 3,3'-bitolylene-4,4'-diisocyanate | 132.78 | 132.13 |
| 4 | Mobay Chemical Co.; Mondur N 5; MO N 5 | 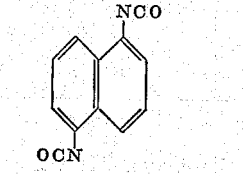 Naphthylene-1,5-diisocyanate | 116.58 | 105.09 |
| 5 | Mobay Chemical Co.; Mondur TM; MO TM | 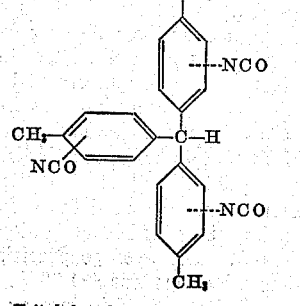 Tritolylmethane triisocyanate | 107.78 | 123.45 |

TABLE II.—REPRESENTATIVE ISOCYANATE.—Continued

| No. | Commercial source, trade name, and abbreviation | Structure | Amine equivalent Observed | Amine equivalent Theory |
|---|---|---|---|---|
| 6 | Mobay Chemical Co.; Mondur HX; MO HX | OCN(CH$_2$)$_6$NCO<br>Hexamethylene diisocyanate | 103.39 | 84.01 |
| 7 | Mobay Chemical Co.; Mondur O; MO O | CH$_3$(CH$_2$)$_{17}$NCO<br>Octadecylisocyanate | 342.32 | 295.0 |
| 8 | Shell Development Co.; Durenediisocyanate; Dur | 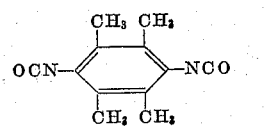<br>2,3,5,6-tetramethyl-1,4-benzene diisocyanate | 111.22 | 108.12 |

It will be noted that an observed and theoretical amine equivalent is specified for each isocyanate. The amine equivalent refers to the weight of the isocyanate containing one isocyanate group and reacting with one mole of di-n-butylamine. Since the isocyanates available commercially are not necessarily chemically pure, the observed values were obtained for use as a guide in formulating reaction products therefrom as these values provide a measure of the actual purity of each compound.

The analytical procedure used to determine amine equivalents of diisocyanates is found in Monsanto Chemical Company's Technical Bulletin #P-125 and is generally as follows:

Twenty-five milliliters of redistilled toluene and 25 ml. of approximately 2 N di-n-butylamine were placed in a carefully cleaned and dried 250 ml. or 500 ml. Erlenmeyer flask. The sample of diisocyanate was drawn into a warmed glass bulb and the neck sealed off in a flame. Sample weight is determined by the difference in weight between the empty and the filled bulb. The bulb was immersed in the Erlenmeyer flask and crushed beneath the surface of the liquid. The solution was heated to boiling and allowed to cool 1 hour. 100 ml. of technical methanol and 0.5 ml. of bromophenol blue indicator was added. It was then titrated with 1 N HCl to a yellow end point. The indicator was prepared by taking 0.1 g. of bromophenol blue, 1.5 ml. of 0.1 N NaOH diluted with 100 ml. of distilled H$_2$O. The average precision demonstrated by these determinations was ±1.29%.

The following examples, presented in tabular form to conserve space, illustrate the conversion of mixtures of polybasic acids and polyisocyanates alone and modified with a monoisocyanate to insoluble, infusible products. Each of the resinous acids was dissolved in the designated solvent to a non-volatile content of 40–60%. The isocyanates and modifiers were used in most examples at 100% non-volatile content. In some instances, however, the modifier was dissolved in small amounts of the same solvent for solubility purposes. The mixtures thus obtained were applied to glass panels at .002" wet film thickness. The table gives the heat treatment used for conversion and indication of film flexibility and water and alkali resistance in actual applications. All parts are by weight.

TABLE III.—EXAMPLES OF THE INVENTION AS A COATING

| Ex. No. | Polybasic acid | Parts | Polyisocyanate | Parts | Monoisocyanate | Parts | Solvent | Conversion Time (hrs.) | Conversion Temp., °C. | Film properties | Withstood in hrs. H$_2$O at 100° C. | Withstood in hrs. 5% aq. NaOH at 25° C. |
|---|---|---|---|---|---|---|---|---|---|---|---|---|
| I | PBR 1 | 143 | HY T | 32 | MO O | 86 | MIK¹ | 0.5 | 175 | Flexible | 1.5 | 6.5 |
| II | PBR 1 | 143 | HY T | 54 | | | MIK | 0.5 | 175 | Brittle | 15+ | 1 |
| III | PBR 1 | 143 | HY M | 84 | | | MIK | 0.5 | 175 | ___do___ | 15+ | 6.5 |
| IV | PBR 1 | 143 | HY M | 49 | MO O | 86 | MIK | 0.5 | 175 | Flexible | 16+ | 6.5 |
| V | PBR 1 | 143 | N 200 | 46 | MO O | 86 | MIK | 0.5 | 175 | Brittle | 16+ | 1 |
| VI | PBR 1 | 143 | MO HX | 36 | | | MIK | 0.5 | 175 | Flexible | 9+ | 7 |
| VII | PBR 1 | 143 | Dur | 67 | | | MIK | 0.5 | 175 | ___do___ | 6.5 | .08 |
| VIII | PBR 2 | 121 | HY T | 54 | | | MIK | 0.5 | 175 | Brittle | 17+ | .25 |
| IX | PBR 2 | 121 | HY M | 84 | | | MIK | 0.5 | 175 | ___do___ | 8+ | 5+ |
| X | PBR 2 | 121 | MO N5 | 41 | MO O | 86 | MIK | 0.5 | 175 | ___do___ | 1.5 | .08 |
| XI | PBR 2 | 121 | MO TM | 323 | | | MIK | 0.5 | 175 | ___do___ | 17+ | 4 |
| XII | PBR 2 | 121 | MO HX | 62 | | | MIK | 0.5 | 175 | ___do___ | 17+ | 1.5 |
| XIII | PBR 2 | 121 | N 200 | 46 | MO O | 86 | MIK | 0.5 | 175 | ___do___ | 17+ | .5 |
| XIV | PBR 3 | 114 | HY T | 54 | | | Dioxane | 0.5 | 175 | ___do___ | 18+ | 33+ |
| XV | PBR 3 | 114 | N 200 | 46 | MO O | 86 | ___do___ | 0.5 | 175 | Flexible | 18+ | 33+ |
| XVI | PBR 3 | 114 | MO TM | 323 | | | ___do___ | 0.5 | 175 | Brittle | 18+ | 33+ |
| XVII | PBR 3 | 114 | MO HX | 62 | | | ___do___ | 0.5 | 175 | Flexible | 18+ | 33+ |
| XVIII | PBR 4 | 93 | HY M | 84 | | | ___do___ | 0.5 | 175 | ___do___ | 18+ | 9 |
| XIX | PBR 4 | 93 | MO TM | 323 | | | ___do___ | 0.5 | 175 | Brittle | 18+ | 48+ |
| XX | PBR 4 | 93 | MO HX | 62 | | | ___do___ | 0.5 | 175 | Flexible | 18+ | 2 |
| XXI | PBR 4 | 93 | MO N5 | 70 | | | ___do___ | 0.5 | 175 | Brittle | 1 | .08 |

¹ MIK is abbreviation for methyl isobutyl ketone.

It will be understood that the description of flexibility is purely relative and indicates merely whether or not a substantial part of the film could be peeled or stripped intact from the panel. Varying degrees of flexibility or brittleness are encompassed by the general descriptive terms used. Products which might be too brittle for use on film wherein considerable flexibility was a requisite would nevertheless be useful in films where flexibility is of no importance or in cast or molded articles.

In order to demonstrate the preparation of a foam resin structure in accordance with the invention, the following examples were prepared:

*Example XXII*

618 parts of PBR, 4, 30 parts of polyoxethylene sorbitan mono-oleate, an emulsifier sold under the trade-name "Tween 80" by Atlas Powder Company, and 3.6 parts of triethylamine were stirred in an open container to a homogeneous mixture with sufficient heat being supplied to liquefy the polybasic acid. 414 parts of hexamethylene diisocyanate were added, with continuous stirring, following which the temperature of the mixture was raised to 110° C. The reaction occurred instantaneously with vigorous foaming. The mass solidified within a short period of time, although heating was continued for a total of about five minutes in order to insure that a complete cure had been effected. The product was a rigid, hard foam having slight flexibility.

*Example XXIII*

Example XXII was repeated, except that 517 parts of hexamethylene diisocyanate were employed. The product was a rigid, tough foam that was moderately flexible.

*Example XXIV*

Example XXII was repeated, except that 804 parts of PBR 2 were employed with 40 parts of emulsifier, 3.6 parts of catalyst, and 560 parts of methylene bis(4-phenyl isocyanate). The foam that was obtained was rigid, hard and tough.

*Example XXV*

Example XXIV was repeated decreasing the amount of methylene bis(4-phenyl isocyanate) to 480 parts. Again the foam was rigid, hard and tough.

The foregoing examples are furnished only for the guidance of those seeking to practice the invention and not for the purpose of defining the boundaries within which it is operative. Numerous other embodiments are possible and will be suggested by these few illustrations.

Having thus described the invention, that which is claimed is:

1. A composition of matter comprising the reaction product of (A) a compound of the general formula $R(NCX)_z$ wherein R is an organic radical having a valency of $z$, X is a member of the group consisting of oxygen and sulphur and $z$ is an integer having a value of more than 1, and (B) a resinous polycarboxylic acid which is the condensation product of (1) a pentanoic acid consisting essentially of 4,4 bis(4-hydroxyaryl)pentanoic acid wherein the hydroxyaryl radical is a hydroxyphenyl radical and is free from substituents other than alkyl groups of from 1 to 5 carbon atoms and (2) a coupling agent having the general formula X—A—X wherein X is a member of the group consisting of halogen atoms and vic epoxide groups, only one X of the X—A—X being a vic epoxy group and A is a divalent radical of from 1–10 carbon atoms selected from the group consisting of hydrocarbon, oxahydrocarbon, hydroxy substituted hydrocarbon, and hydroxy substituted oxahydrocarbon, wherein (A) and (B) are present on an equivalent ratio of from about 5:1 to 1:5.

2. The composition of matter of claim 1 wherein the petanoic acid of (B–1) consists essentially of 4,4 bis(4-hydroxyaryl)pentanoic acid wherein the hydroxyaryl radical is a hydroxyphenyl radical and is free from substituents other than alkyl groups of one carbon atom.

3. The composition of matter of claim 1 wherein the pentaonic acid of (B–1) is 4,4 bis(4-hydroxyphenyl)pentanoic acid.

4. The composition of matter of claim 3 wherein (A) and (B) are present on an equivalent ratio of from about 2:1 to 1:2.

5. The composition of matter as described in claim 4 wherein (A) is an aromatic polyisocyanate.

6. The composition of matter as described in claim 4 wherein (A) is an aliphatic polyisocyanate.

7. A method of preparing a new composition of matter which comprises admixing (A) a compound of the general formula $R(NCX)_z$ wherein R is an organic radical having a valency of $z$, X is a member of the group consisting of oxygen and sulphur, and $z$ is an integer having a value of more than 1 and (B) a resinous polycarboxylic acid which is the condensation product of (1) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and (2) a coupling agent having the structural formula X—A—X wherein X is a member of the group consisting of halogen atoms and vic epoxide groups, only one X of the X—A—X being a vic epoxy group and A is a divalent radical of 1–10 carbon atoms selected from the group consisting of hydrocarbon, oxahydrocarbon, hydroxy substituted hydrocarbon, and hydroxy substituted oxahydrocarbon, wherein (A) and (B) are present on an equivalent ratio of from about 5:1 to 1:5, and heat converting said mixture to an insoluble, infusible resin.

References Cited in the file of this patent

UNITED STATES PATENTS

| | | |
|---|---|---|
| 2,060,715 | Arvin | Nov. 10, 1936 |
| 2,374,136 | Rothrock | Apr. 17, 1945 |

UNITED STATES PATENT OFFICE
CERTIFICATE OF CORRECTION

Patent No. 2,907,747

October 6, 1959

Sylvan O. Greenlee

It is hereby certified that error appears in the printed specification of the above numbered patent requiring correction and that the said Letters Patent should read as corrected below.

Column 3, line 66, before "phenolic" insert -- a --; columns 9 and 10, TABLE II, under the heading "Structure" and opposite No. "2", the structural formula "Methylene bis(4-phenyl isocyanate) should appear as shown below instead of as in the patent:

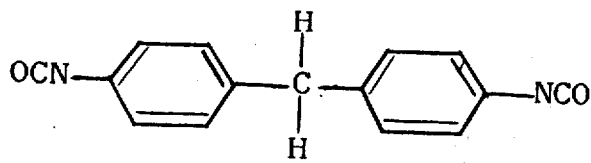

column 13, line 46, for "substituants" read -- substituents --.

Signed and sealed this 2nd day of August 1960.

(SEAL)
Attest:

CARL H. AXLINE
Attesting Officer

ROBERT C. WATSON
Commissioner of Patents